US010955321B2

(12) United States Patent
Tatnell et al.

(10) Patent No.: US 10,955,321 B2
(45) Date of Patent: Mar. 23, 2021

(54) BIOLOGICAL SAMPLE COLLECTORS AND HANDLING THEREOF

(71) Applicant: Global Life Sciences Solutions Operations UK Ltd, Sheffield (GB)

(72) Inventors: Peter James Tatnell, Cardiff (GB); Jeffrey Kenneth Horton, Peterston-super-Ely (GB); Christopher George Norey, Cardiff (GB); Alan Stuart Pierce, Cardiff (GB); Robert John, Cardiff (GB)

(73) Assignee: Global Life Sciences Solutions Operations UK Ltd, Sheffield (GB)

( * ) Notice: Subject to any disclaimer, the term of this patent is extended or adjusted under 35 U.S.C. 154(b) by 364 days.

(21) Appl. No.: 15/562,696

(22) PCT Filed: Mar. 23, 2016

(86) PCT No.: PCT/EP2016/056414
§ 371 (c)(1),
(2) Date: Sep. 28, 2017

(87) PCT Pub. No.: WO2016/156155
PCT Pub. Date: Oct. 6, 2016

(65) Prior Publication Data
US 2018/0058986 A1 Mar. 1, 2018

(30) Foreign Application Priority Data
Mar. 31, 2015 (GB) .................................... 1505516

(51) Int. Cl.
*G01N 1/28* (2006.01)
*G01N 1/00* (2006.01)
*G01N 1/44* (2006.01)
*B01L 3/00* (2006.01)

(52) U.S. Cl.
CPC .......... *G01N 1/2813* (2013.01); *B01L 3/5055* (2013.01); *G01N 1/44* (2013.01); *B01L 2200/082* (2013.01); *B01L 2200/18* (2013.01); *B01L 2300/043* (2013.01); *B01L 2300/126* (2013.01); *G01N 2001/002* (2013.01); *G01N 2001/005* (2013.01); *G01N 2001/2826* (2013.01)

(58) Field of Classification Search
CPC .......... B01L 2200/082; B01L 2200/18; B01L 2300/043; B01L 2300/126; B01L 3/5055; G01N 1/2813; G01N 1/44; G01N 2001/002; G01N 2001/005; G01N 2001/2826
See application file for complete search history.

(56) References Cited

U.S. PATENT DOCUMENTS

| 5,972,386 A | * | 10/1999 | Burgoyne | ............ C12Q 1/6806 424/486 |
| 7,819,028 B2 | | 10/2010 | Christie et al. | |
| 8,986,607 B2 | | 3/2015 | Anderle et al. | |
| 9,877,672 B2 | | 1/2018 | Dahl et al. | |
| 2006/0018789 A1 | | 1/2006 | LaStella | |
| 2007/0009377 A1 | * | 1/2007 | Goodrich | ............... A61L 2/0011 422/24 |
| 2007/0166191 A1 | | 7/2007 | Cleator | |
| 2009/0024060 A1 | | 1/2009 | Darrigrand et al. | |
| 2014/0084179 A1 | * | 3/2014 | Ben-Hur | ................ A61L 2/0047 250/429 |
| 2014/0106974 A1 | | 4/2014 | Sun et al. | |
| 2014/0373644 A1 | * | 12/2014 | Iraneta | ................... G01N 33/49 73/863.23 |
| 2016/0303562 A1 | * | 10/2016 | Horton | ...................... B01L 3/52 |

FOREIGN PATENT DOCUMENTS

| EP | 0 117 689 A1 | 9/1984 |
| EP | 0 269 362 A2 | 6/1988 |
| EP | 1 619 502 A1 | 1/2006 |
| WO | 94/03774 A1 | 2/1994 |
| WO | 00/86664 A1 | 12/2000 |
| WO | 2014/008060 A1 | 1/2014 |
| WO | WO 2015058958 | * 4/2015 |

OTHER PUBLICATIONS

Japanese Office Action for JP Application No. 2017-550916 dated Dec. 23, 2019 (12 pages with English Translation).
PCT International Search Report and Written Opinion for PCT Application No. PCT/EP2016/056414 dated Jul. 6, 2016 (12 pages).
GB Search Report for GB Application No. 1505516.3 dated Dec. 18, 2015 (5 pages).
Chinese Office Action for CN Application No. 201680020074.9 dated May 24, 2019 (20 pages with English Translation).
Japanese Office Action for JP Application No. 2017-550916 dated Nov. 16, 2020 (10 pages with English translation).

* cited by examiner

*Primary Examiner* — Cynthia B Wilder
(74) *Attorney, Agent, or Firm* — Eversheds Sutherland (US) LLP

(57) ABSTRACT

Disclosed is a biological sample collector 500 comprising a solid support 12 having plural discrete areas (22, 24, 26, 28 FIG. 1) for accepting a biological sample, each area being chemically differentiated, for example by having a different chemical treatment sorbed onto the solid support. An envelope 530 encloses the solid support. A cover portion 520 can cover the biological sample after collection to prevent infection. UV light can be applied to the collected sample to reduce the risk of infection.

9 Claims, 13 Drawing Sheets

BIOLOGICAL SAMPLE COLLECTORS AND HANDLING THEREOF

CROSS REFERENCE TO RELATED APPLICATIONS

This application claims the priority benefit of PCT/EP2016/056414 filed on Mar. 23, 2016 which claims priority benefit of Great Britain Application No. 1505516.3 filed Mar. 31, 2015. The entire contents of which are hereby incorporated by reference herein.

FIELD OF THE INVENTION

The present invention relates to biological sample collectors and handling thereof. In particular, but not exclusively this invention relates to the collection and handling of biological samples from potentially infectious subjects such as those infected with Ebola Virus Disease (EVD).

BACKGROUND OF THE INVENTION

According to the World Health Organisation, as of 1 Oct. 2014, a total number of 7,203 cases including 3,340 deaths from EVD were reported from West Africa (Guinea, Liberia, Sierra Leone, Senegal, Nigeria). At that time, experts from the WHO and Imperial College London were predicting infection numbers would continue to climb exponentially unless Ebola control measures in West Africa were enhanced quickly.

What was learned was that while effective intervention strategies such as new treatment and vaccines were being explored, accurate diagnosis of EVD was a key element in responding to that outbreak, and will be key to future outbreaks. Presently, controlling such an epidemic relies heavily on laboratory testing to appropriately direct patients to either an Ebola Treatment Centre or another setting. Current laboratory capacity relies on mobile laboratory units and other designated laboratories to run molecular assays such as PCR assays or ELISA/antibody based tests such as lateral flow tests, to confirm EVD. These laboratories should, in theory communicate with Ebola Treatment Centres. There is growing recognition that while these laboratories are very important, in the 2014 EVD outbreak, they could not address all the diagnostic needs, particularly in those African countries affected where there is little or no healthcare infrastructure; there is thus still an urgent need for new rapid, point of contact/care EVD tests to be used in decentralized health care facilities which do not require extensive biosafety requirements. In addition to EVD, the same need will undoubtedly occur in future for other diseases such as other haemorrhagic disease outbreaks and new strains of influenza, as well as diagnosis of more establish diseases such as HIV.

Such rapid EVD tests will allow for early diagnosis and referral to Ebola Treatment Centres or other points of care, enhancing patient and community outcomes through earlier support of patients and families, contact tracing and isolation.

The fear of contracting EVD in the affected areas may greatly reduce the prevalence and effectiveness of patient sample collection. This in turn could have a detrimental effect not just on diagnosis, but also on research material available for genetic and other studies looking at factors which influence patient outcomes.

The current preferred method for diagnosis of EVD is based on molecular techniques using antibody based tests such as lateral flow assays. However, it has also noted that numerous methods based on different technologies and biomarkers can potentially be used for the detection of EVD. For example, antigen detection tests may play a useful role in the control of this EVD outbreak if they can be highly sensitive. A number of automatic semi-portable Nucleic Acid Amplification Test platforms have also been developed for other diseases such as HIV, TB and malaria and may potentially be used for EVD detection if adapted to the appropriate biosafety requirements. However, whatever the technologies and biomarkers chosen, the type of specimen to be used and the collection requirements will be crucial in achieving tests feasible for use in disseminated locations. The amount of training required for local staff to conduct the testing should also be kept to a minimum.

The WHO have specified certain key considerations for effective diagnosis of EVD, having regard in particular to the clinical setting where such diagnosis is likely to take place:

Useable by decentralized health care facilities with no/minimal laboratory infrastructures;

The need to distinguish between symptomatic patients with acute Ebola virus infection and non-Ebola virus infection without the need for confirmatory testing;

Greater than 99% analytical specificity;

Diagnoses from only finger prick blood sampling, in preference to venous blood from phlebotomy;

Little or no sample preparation required;

Stability of any reagents use—room temperature (5-50 degrees Celsius) storage with a shelf life>24 months at 90% RH.

The inventors have realised that an improved sample collector and sample handling could address at least the key considerations mentioned immediately above.

Whilst the WHO are focused on effective diagnosis and treatment of patients, there are other advantages to embodiments of the improved patient sample collector and sample handling apparatus described herein. In particular, because of the reluctance to come into contact with EVD carriers, samples are not collected as frequently as they could be. Thus more limited research sample material is available, as mentioned above. When samples can be obtained, transported and stored with lower risk of infection, and stored in a way which permits numerous assays to be performed, then this, the inventors have realised, will facilitate the advance the understanding of EVD and other infectious diseases sampled.

Contracting EVD

Whilst the infection mechanism of EVD is not fully understood, there is thought to be two potential candidates for the host cell entry of the virus via proteins:

1. The first is a cholesterol transporter protein, the host-encoded Niemann-Pick C1 (NPC1), which appears to be essential for entry of Ebola virions into the host cell and for its ultimate replication. In one study, mice with one copy of the NPC1 gene removed showed an 80 percent survival rate fifteen days after exposure to mouse-adapted Ebola virus, while only 10 percent of unmodified mice survived this long. In another study, small molecules were shown to inhibit EVD infection by preventing viral envelope glycoprotein (GP) from binding to NPC1 Hence, NPC1 was shown to be critical to entry of this filovirus, because it mediates infection by binding directly to viral GP.

When cells from Niemann-Pick Type C patients lacking this transporter were exposed to Ebola virus in the laboratory, the cells survived and appeared impervious to the virus, further indicating that Ebola relies on NPC1 to enter cells.

Mutations in the NPC1 gene in humans were conjectured as a possible mode to make some individuals resistant to this deadly viral disease. The same studies described similar results regarding NPC1's role in virus entry for Marburg virus, a related filovirus. A further study has also presented evidence that NPC1 is the critical receptor mediating Ebola infection via its direct binding to the viral GP, and that it is the second "lysosomal" domain of NPC1 that mediates this binding.

2. The second candidate is TIM-1 (aka HAVCR1). TIM-1 was shown to bind to the receptor binding domain of the EVD glycoprotein, to increase the receptivity of Vero cells. Silencing its effect with siRNA prevented infection of Vero cells. TIM1 is expressed in tissues known to be seriously impacted by EVD lysis (trachea, cornea, and conjunctiva). A monoclonal antibody against the IgV domain of TIM-1, ARDS, blocked EVD binding and infection.

Together, these studies suggest NPC1 and TIM-1 may be potential therapeutic targets for an Ebola anti-viral drug and may as a basis for a rapid field diagnostic assay.

EVD Replication

Being acellular, viruses such as Ebola do not replicate through any type of cell division; rather, they use a combination of host and virally encoded enzymes, alongside host cell structures, to produce multiple copies of themselves. These then self-assemble into viral macromolecular structures in the host cell. The virus completes a set of steps when infecting each individual cell. The virus begins its attack by attaching to host receptors through the glycoprotein (GP) surface peplomer and is endocytosed into macropinosomes in the host cell. To penetrate the cell, the viral membrane fuses with vesicle membrane, and the nucleocapsid is released into the cytoplasm. Encapsidated, negative-sense genomic ssRNA is used as a template for the synthesis (3'-5') of polyadenylated, monocistronic mRNAs and, using the host cell's ribosomes, tRNA molecules, etc. the mRNA is translated into individual viral proteins.

These viral proteins are processed: a glycoprotein precursor (GP0) is cleaved to GP1 and GP2, which are then heavily glycosylated using cellular enzymes and substrates. These two molecules assemble, first into heterodimers, and then into trimers to give the surface peplomers. Secreted glycoprotein (sGP) precursor is cleaved to sGP and delta peptide, both of which are released from the cell. As viral protein levels rise, a switch occurs from translation to replication. Using the negative-sense genomic RNA as a template, a complementary +ssRNA is synthesized; this is then used as a template for the synthesis of new genomic (−)ssRNA, which is rapidly encapsidated. The newly formed nucleocapsids and envelope proteins associate at the host cell's plasma membrane; budding occurs, destroying the cell.

In view of the above, the inventors have realised that a multiple format sample collection device is needed which can capture and store DNA, RNA (mRNA, viral RNA, ssRNA), and proteins, in a safe, non-infectious manner, and thereby provide a sample which can be used not just for diagnosis, but also for future research, with lower risk of subsequent infection from handling the stored sample.

SUMMARY OF THE INVENTION

The invention provides a sample handling method, a sample collector, and sample collector apparatus, all according to the independent claims, having preferred features defined by dependent claims. The invention extends also to an infectious sample collecting method as claimed.

The invention extends to any combination of features disclosed herein, whether or not such a combination is mentioned explicitly herein or claimed. Further, where two or more features are mentioned in combination, it is intended that such features may be claimed separately without extending the scope of the invention.

BRIEF DESCRIPTION OF THE DRAWINGS

The invention can be put into effect in numerous ways, illustrative embodiments of which are described below with reference to the drawings, wherein:

Referring to FIG. 1, there is shown a sample collector 10 comprising a solid support material 12, in this case a cellulose fibre matrix, for example formed into a paper material. The solid support includes plural discrete areas 20 which may be chemically treated, or untreated. In this case the areas of the solid support include a first area 22, a second area 24, a third area 26 and a fourth area 28 as defined below.

Figure 1:
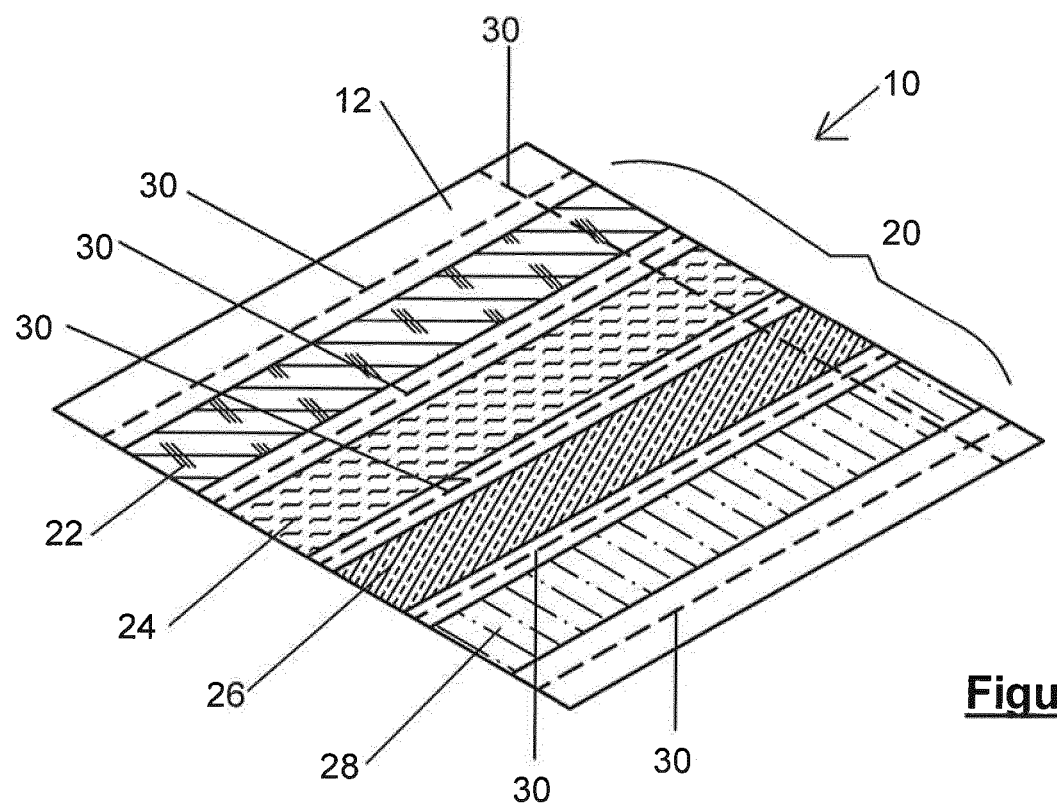
FIG. 1 shows one embodiment of a first sample collector.

These areas 22, 24, 26, and 28, are delimited by perforations 30 which limit the wicking of sample liquids, for example between the areas. In use, this embodiment of the sample collector 10, can be employed to collect whole blood from a finger prick, which can be wiped over the solid support 12 from one side to the other to provide a biological sample on each of the plural areas 22 to 28.

Area 22 is chemically coated with a proprietary formulation known commercially as FTA; comprising a weak base, a chelating agent and an anionic surfactant. This formulation allows a portion of the collector 10/100 to be punched from the collector and received in a single receptacle for further processing. As an example the punched sample can be used to perform STR and genetic profiling, to confirm patient identity & DNA sequence of binding receptors that facilitate viral cellular entry, for research purposes For example, a genetic profile which relates to the receptors that EVD binds to can be identified, as well as genetic profiles which demonstrate mutations that facilitate entry. Conversely genetic profiles of individuals who demonstrate some form of resistance can also be obtained. Importantly, the chemical treatment allows room temperature dry storage of the biological sample, without significant deterioration.

Area 24, is chemically treated with a chemical formulation known commercially as FTA Elute or FTAe, comprising protein denaturant, for example, guanidinium thiocyanate, which allows the isolation of DNA in a liquid form. This is advantageous as an alternative to FTA, for downstream applications, e.g. cloning, and provides means of storing DNA, with a simple elution step for extracting that DNA.

Area 26 is chemically treated with a proprietary chemical coating known commercially as RSM, comprising a protein denaturant, a reducing agent and a buffer, and preferably, an antioxidant and/or a free radical trap. For example, the protein denaturant may include guanidinium thiocyanate (GuSCN), guanidinium hydrochloride, arginine, sodium dodecyl sulfate (SDS), urea, or any combination thereof. The reducing agent may be tris (2-carboxyethyl) phosphine (TCEP) the buffer may be 3-(N-morpholino) propanesulfonic acid (MOPS), and the antioxidant may be hydroquinone monomethyl ether (MEHQ), hydroquinone (HQ), toluhydroquinone (THQ) or ascorbic acid. The coating allows for the long term room temperature storage and stabilisation of mRNA of the subject as well as viral RNA. RSM facilitates long term storage and stabilisation on intact RNA molecules over a range of different temperatures. Since EVD is a ssRNA virus, RSM will be suitable for storage of this infectious material.

Area 28 is an uncoated (plain paper not chemically treated) area known commercially as Whatman 903 or Whatman 31ETF paper, and is used to facilitate the isolation and analysis of native proteins for applications such as enzyme activity and structural investigations. The paper allows investigations of: host antibodies; viral glycoproteins; host NPC1 expression; host TIM-1 expression; and enzymes.

It is possible to coat some or all of the areas 22, 24, 26 or 28 with an antioxidant to protect nucleic acids from degradation by UV light.

The chemical coatings mentioned above sorbed onto the respective areas provide a sample collector which protects and stabilises the material of interest in a dry (or dryable) state at room temperature. The areas 22, 24, 26 and 28 can thus be chemically differentiated, even if one of the areas has no chemical treatment. The coatings are preferably applied continuously on absorbent coating wheels onto a continuous web of solid support material which is perforated and then cut to length by known techniques.

Figure 2A:
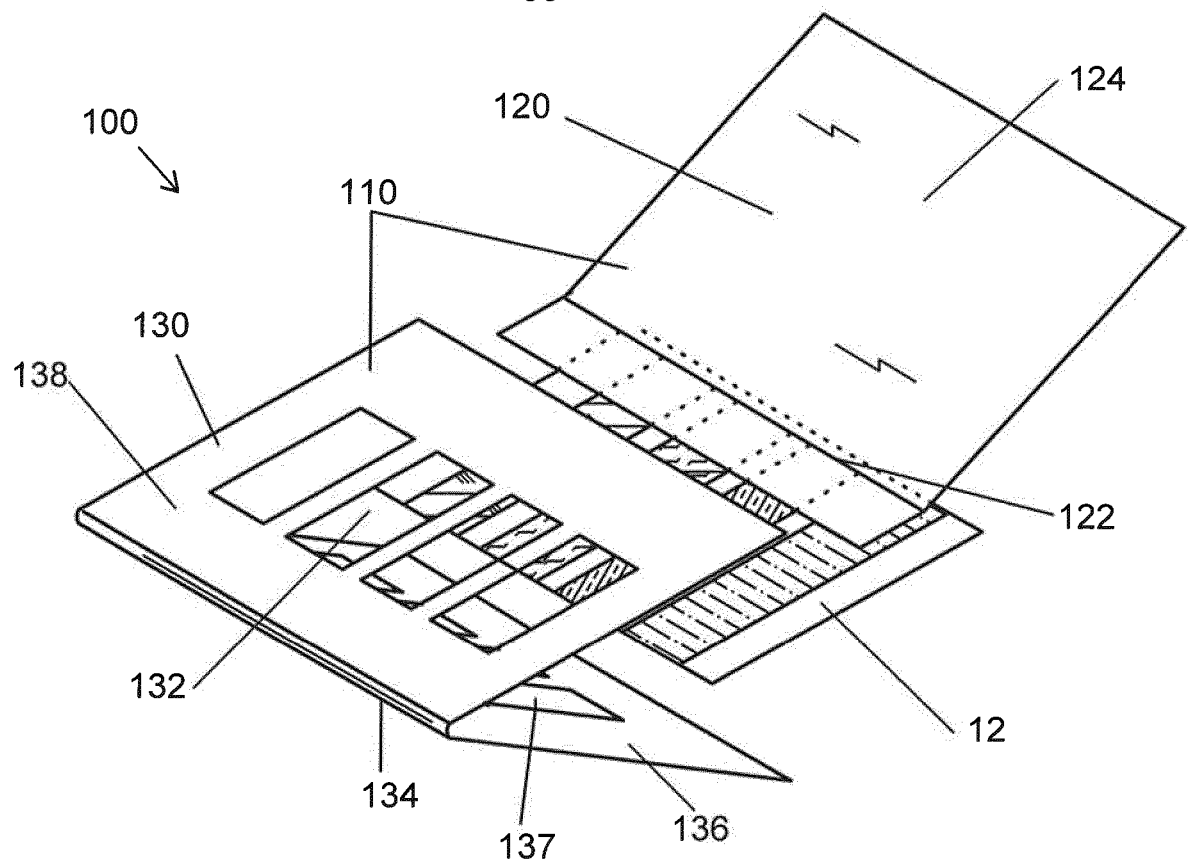
FIG. 2a shows the sample collector of FIG. 1 employed in an envelope, where the envelope is shown exploded and in a preassembled condition.

FIG. 2a shows an exploded view of a second embodiment of a sample collector 100, which employs the sample collector 10, and, an additional envelope 110. The envelope 110, in this case comprises a card support 130 folded in two at fold line 134, for enveloping a sample collector 10, the envelope 110 including windows 132 to expose portions of each of the underlying areas 22, 24, 26 and 28. The envelope further includes a transparent cover portion 120, which is folded at fold line 122. Once assembled, the collector 10 and part of the cover portion 120 are sandwiched between an upper leaf 138 and a lower leaf 136 of the card support 130, leaving just a flap 124 of the cover 120 exposed, and ready to fold over the windows 132 to cover them once a sample has been placed on one or more of the areas and dried. The lower leaf 136 has windows 137, complementary to the windows 132, which allow a portion of the area to be removed, as described below.

Figure 2B:
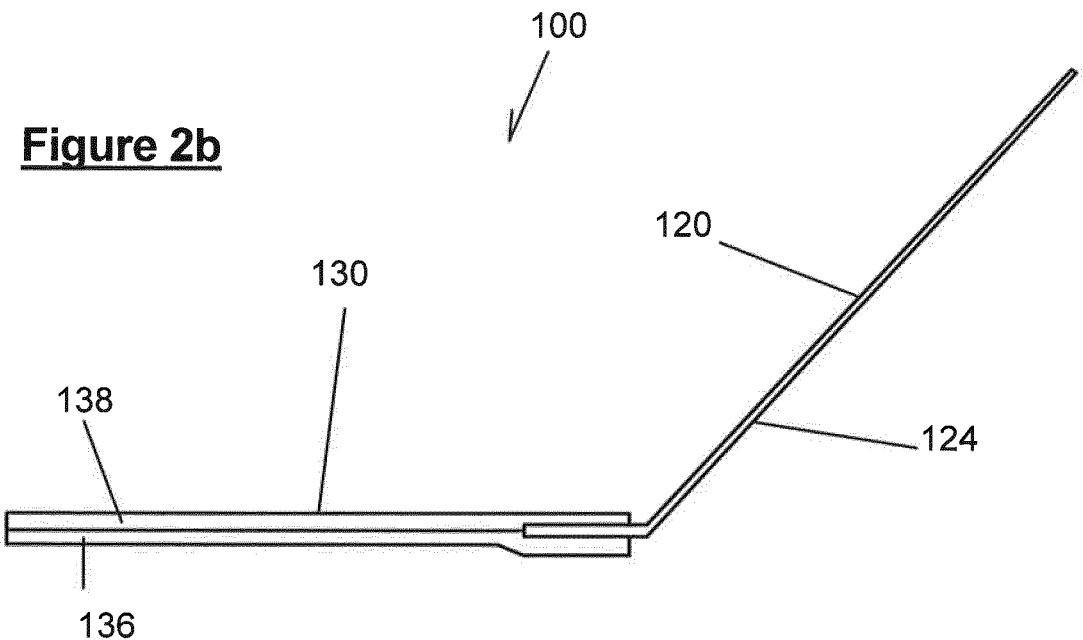
FIGS. 2b and 2c show side and top views respectively of the sample collector shown FIG. 2a, in an assembled condition, to form a second embodiment of a sample collector.
Figure 2C:
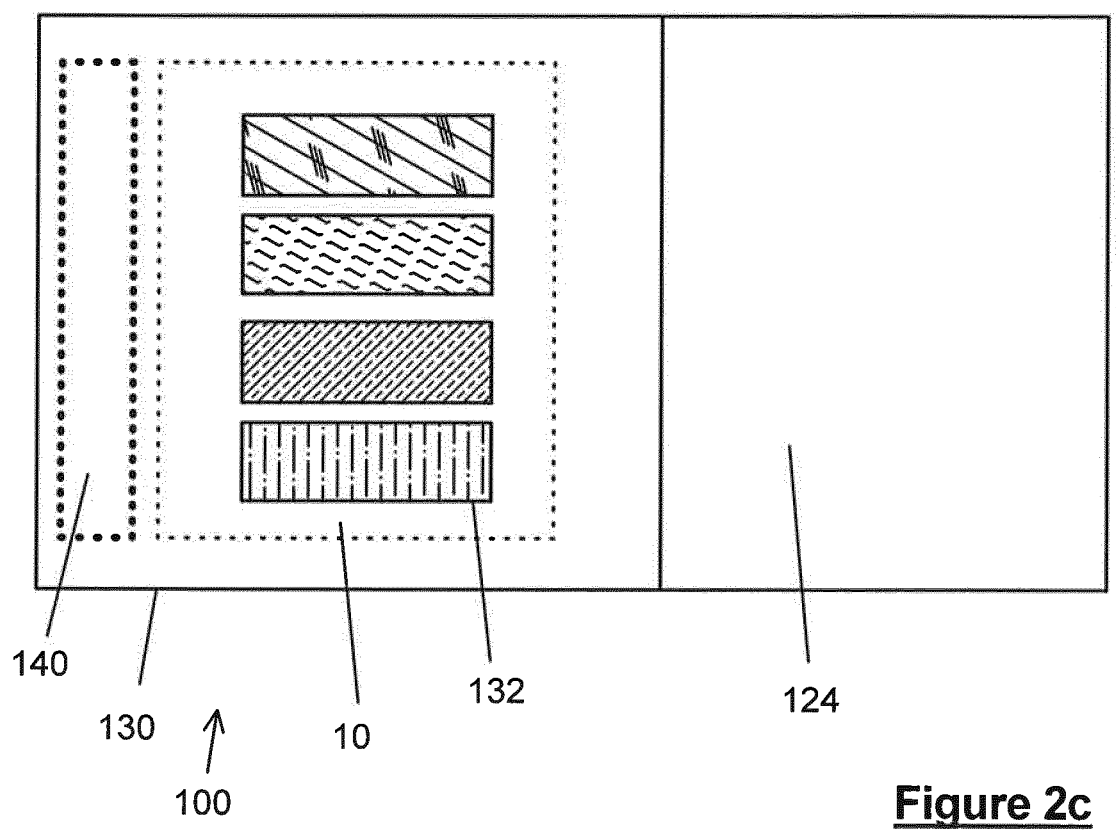

FIGS. 2b and 2c show different views of an assembled sample collector 100. The upper and lower leaves 138 and 136 of the card support 130 are fixed together, for example by means of adhesive. Upper leaf 138 includes a pressure sensitive adhesive strip 140. After a sample is applied to the areas 22, 24, 26 and 28 and has had time to dry, the flap 124 can be pressed against the strip 140, the flap 124 will adhere to the strip and hold it in place to cover the windows 132 and prevent contamination of the sample and infection.

Figure 3A:
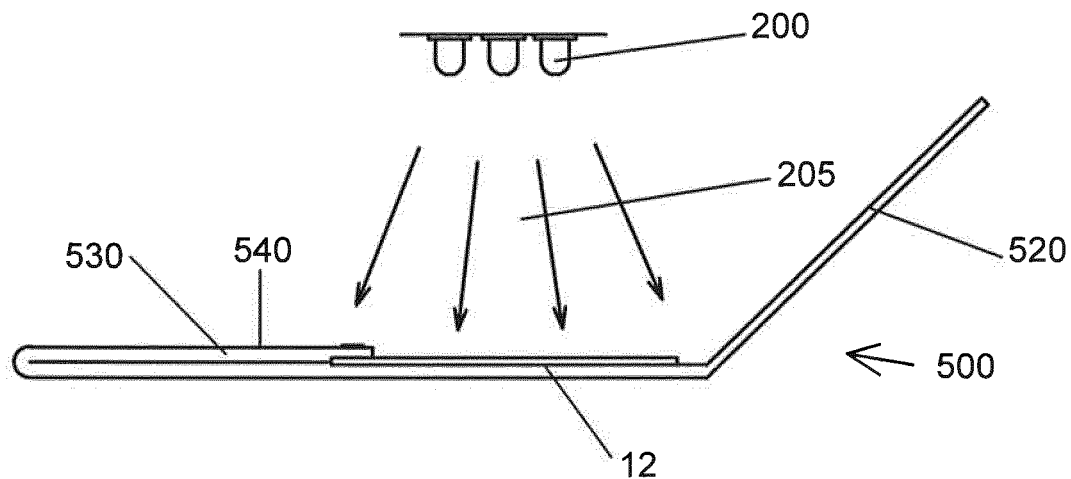
FIGS. 3a, 3b and 3c show a third embodiment of a sample collector, and a schematic representation of apparatus used for processing samples collected on the sample collector and for sample assay.

FIG. 3a shows a third sample collector 500, which includes the solid support 12 as described above in an envelope 520/530. EVD can survive in the environment for up to 48 hours, so it is envisaged that the solid support 12 is subjected to UV light treatment from a bank of UV LEDs 200, for example emitting UV light at around 100-300 nm for several seconds to inactivate any viral activity. The envelope includes an exposed region 540 which allows for identifying indicia, and/or a bar code, and/or an RFID tag.

Figure 3B:
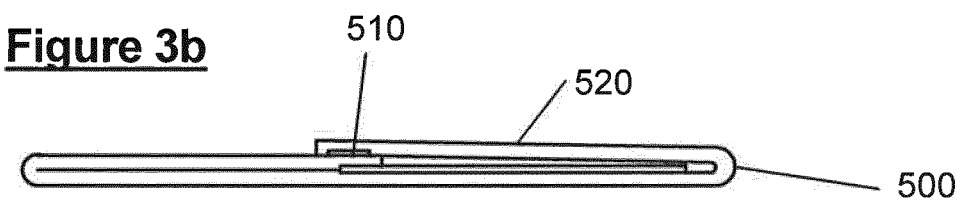

FIG. 3b shows the stored position of the collector 500, where a flap 520 of the envelope is folded over the solid support 12 to protect the solid support from contamination and to further reduce the risk of viral infection, should there be any residual viral activity after UV light treatment. The flap 520 can be held in place by means of pressure sensitive adhesive 510.

Figure 3C:
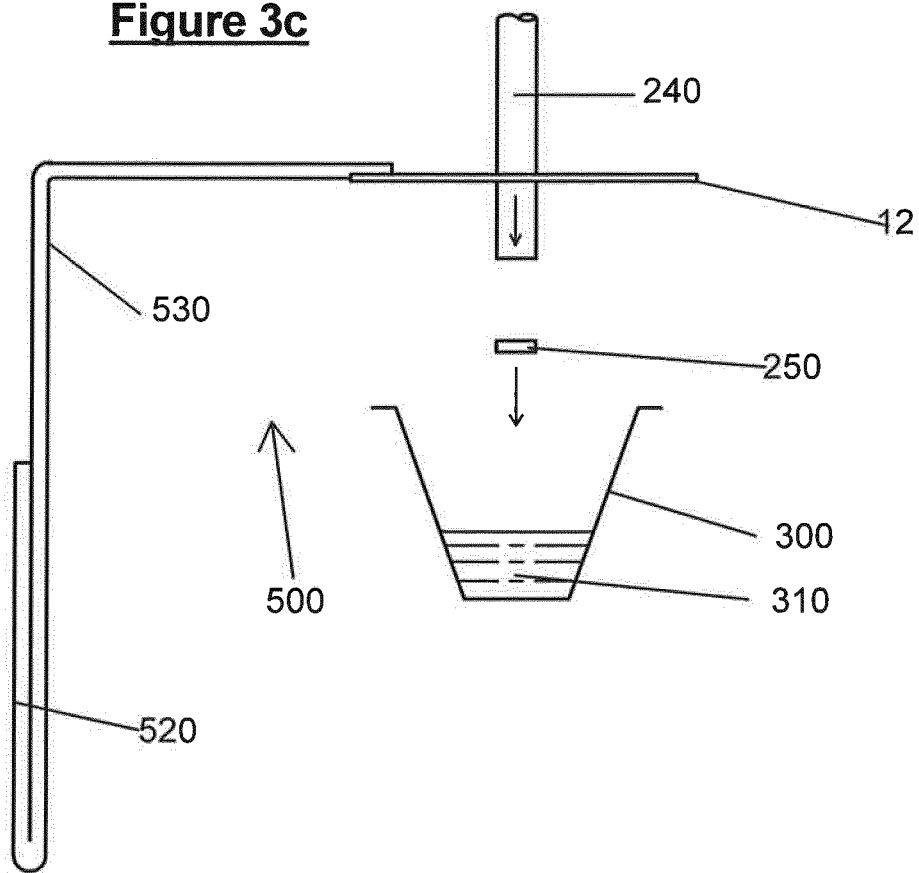

FIG. 3c shows the opened position of the collector 500, for performing one of multiple direct punch-in assays. The sample at areas 22, 24, 26 and/or 28 of solid support 12 are punched by a punch 240 to cause a portion 250 of the solid support 12 to be excised from the remainder of the support, and to be forced directly into a receiving vessel 300 containing a reagent 310. This stage of sample handling is likely to occur remotely from the initial sample collection point, and so the ability to avoid handling the solid support 12 a significant advantage in avoiding infection risks. In particular, the ability to punch directly into a reaction vessel, and to carry out the necessary assay is advantageous. It would be possible to take the whole of the area 22, 24, 26, 28 and perform an assay on that whole area. Therefore, the term 'portion' herein, should be construed as including the whole area.

The same handling procedures as described immediately above can be applied to the sample collectors 10 and 100. If the collector 100 is used, then the flap 140 can be made from plastics material, for example 0.25 mm thick PMMA or polycarbonate without modifiers which will allow UV light to pass. The UV treatment provides viral inactivation, particularly for the Whatman 903 paper area which has no chemical treatment to aid inactivation.

The following description relates to examples of determining DNA, RNA proteins and enzymatic information from a biological sample, which demonstrates that it is possible to obtain significant information from a sample contained on a sample collector of the types mentioned above, long after the sample has been collected, without subjecting the sample and sample collector to any special environment, or any special multistep handling of the biological sample material.

EXAMPLES

1. Protein Recovery and Detection a. Direct measurement of Interleukin-2-Recombinant IL-2±carrier (R & D Systems; Cat. 202-IL-CF-10 µg; lot AE4309112 and Cat. 202-IL-10 µg; lot AE4309081 respectively) was dissolved in blood (TCS Biosciences) at 50 pg or 100 pg/µl. Aliquots [1 µl containing, 50 (B) or 100 (A) pg of IL-2] were applied to GE Healthcare 903 filter papers. These papers are examples of solid supports that are not impregnated with any nucleic acid or protein stabilising chemicals. The biological samples were allowed to dry overnight at ambient temperature and humidity. A portion of the applied sample was removed using a 3 mm diameter Harris punch (GE Healthcare). Single discs containing the biological sample were directly analysed for IL-2 with reagents from a fully configured IL-2 Quantikine ELISA kit (R & D Systems, Cat. D2050, lot 273275). Direct assays were carried out "punch/disc in well". On completion of the assay the optical density was monitored at 450 nm. The recovery of IL-2 was determined by comparing values to a standard curve of known IL-2 concentrations.

Results indicate that the majority of the IL-2 applied to the solid support can be recovered following the direct/punch-in method.

Figure 4:
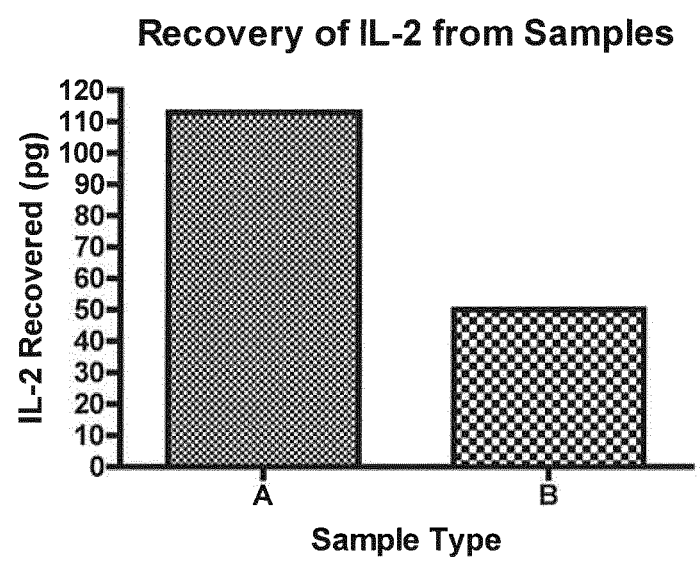
FIGS. 4 to 13 show graphs relating experimental results, described in more detail below.

FIG. 4 shows measurement of model Protein (IL-2) present on the non-chemically treated 903 paper solid supports. A and B represent 100 and 50 pg of IL-2 applied to the solid support respectively. Results indicate that the majority of the IL-2 applied to the solid support can be recovered following the direct/punch-in method.

b. Enzyme Activity Detected from Cells or Recovered Enzymes

Protein and enzyme testing was carried out with fully configured DNase and RNase Contamination Kits (DNase & RNase Alert QC Systems, catalogue codes AM1970 & AM1966, Life Technologies) according to the manufacturer's instructions.

Dideoxyribonuclease (DNase)

In a first series of experiments, 1.2 mm punches were taken from human embryonic stem cells (GE Healthcare; cell line ref: WCB307 GEHC 28) which had been applied to chemically untreated 903 papers in 10 µl volumes as above. DNAse and RNase activity was measured as outlined below. In a second series of experiments, 1.2 mm punches were taken from human embryonic stem cells (GE Healthcare; cell line ref: WCB307 GEHC 28) containing either 0.5 U of DNase or 10 µU of RNase added to these cells which had been applied to 903 papers in 10 µl volumes.

Detection of DNase activity was carried out as follows using a cleavable fluorescent-labelled DNase substrate. Each punch was ejected into separate wells of 96-well plates. Lyophilized DNase Alert Substrate was dissolved in TE buffer (1 ml) and dispensed (10 µl) into the test wells of the 96-well plate. 10× DNase Alert Buffer (10 µl) and nuclease-free water (80 µl) was added and the test solution (100 µl) incubated for 60 minutes at 37° C. The DNase Alert QC System Substrate is a modified DNA oligonucleotide that emits a pink fluorescence when cleaved by DNase. For this assay, fluorescence was measured on a Tecan Ultra (excitation/emission 535/595 nm using medium gain). Solutions containing DNase activity produced a pink fluorescence, whereas solutions without DNase activity did not fluoresce. Thus, higher levels of DNase corresponded to an increase in the amount of light output. Negative controls consisted of nuclease-free water (80 µl) in place of sample. DNAase activity can be detected and quantified in a rate dependent manner using the chemically non-treated 903 papers.

Figure 5:
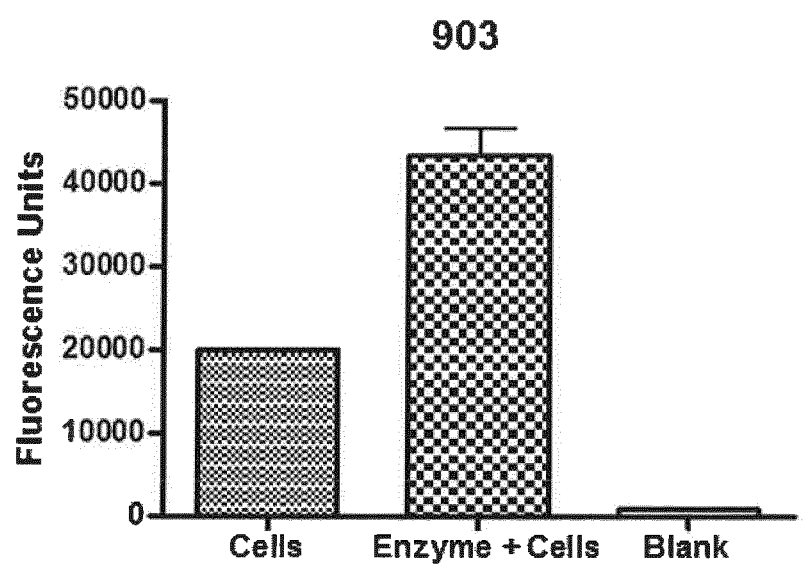

FIG. 5 Measurement of Model Enzyme (DNase) derived from paper-based Solid Supports; 903 is an example of a chemically-non treated cellulose-based solid support.

Referring to FIG.

2. Ribonuclease (RNase) Recovery and Detection

Detection of RNase was carried out as follows using a cleavable fluorescent-labelled RNase substrate. Each punch was ejected into separate wells of 96-well plates. Lyophilized RNase Alert Substrate was dissolved in TE buffer (1 ml) and dispensed (10 µl) into the test wells of the 96-well plate. 10× RNase Alert Buffer (10 µl) and nuclease-free water (80 µl) was added and the test solution (100 µl) incubated for 60 minutes at 37° C. The RNase Alert QC System Substrate is a modified RNA oligonucleotide that emits a green fluorescence when cleaved by RNase. For this assay, fluorescence was measured on a Tecan Ultra (excitation/emission 485/535 nm using medium gain). Solutions containing RNase produced a green fluorescence, whereas solutions without RNase activity did not fluoresce. Thus, higher levels of RNase corresponded to an increase in the amount of light output. Negative controls consisted of nuclease-free water (80 µl) in place of sample.

Figure 6:
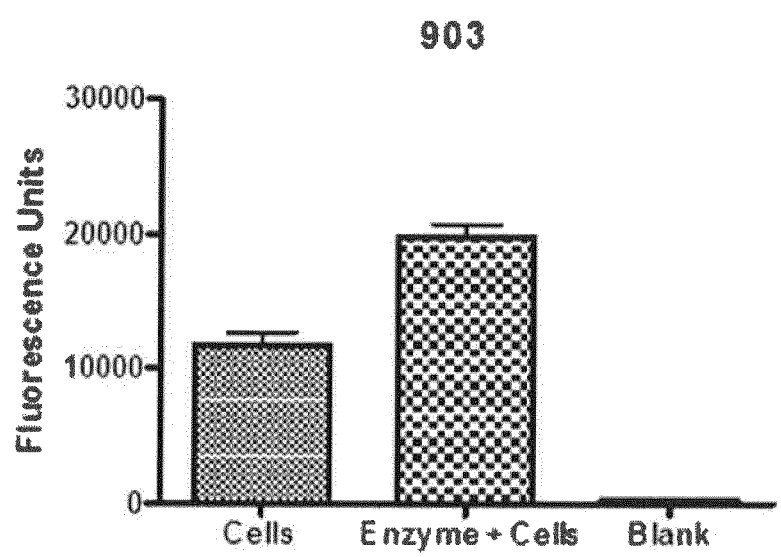

These data indicated that RNAase activity can be detected and quantified in a rate dependent manner from biological samples applied to Whatman (GE Healthcare) 903 papers. FIG. 6 Measurement of Model Enzyme (RNase) derived from paper-based Solid Supports; FTA is an example of a chemically-treated paper whilst 903 is an un-treated paper.

3. Genomic DNA Analysis Using FTA Sample Collection Cards in Direct Amplification Workflows a. Direct PCR from Blood Preserved on Whatman FTA Sample Collection Cards Thermo Scientific Phusion Blood Direct PCR Kit was demonstrated to support the amplification of DNA directly from blood samples stored on Whatman FTA sample collection cards (Chum and Andre 2013; Thermo Fisher Scientific). FTA cards are examples of chemical coated paper-based cards. In direct amplification workflows, no prior DNA extraction or purification steps are needed and the cards are simply added to the PCR reaction mixture.

Sample preparation: Fresh blood or blood preserved with heparin (1.4 IU/ml), $K_2EDTA$ (1.8 mg/ml), or Na Citrate (109 mM) was applied to Whatman FTA Gene Cards and dried as per the manufacturer's instructions. For direct PCR, a 1 mm diameter disc was punched out of the sample in the card and used in a 50 µl PCR reaction volume. When larger punches or smaller reaction volumes were used, punches were washed with 20 µl of $H_2O$ at 50° C. for 3 minutes. After removing the $H_2O$, PCR components were added directly to the rinsed punch, as shown in Table 1 below.

TABLE 1

| Component | 25 µL Reaction | 50 µL Reaction | Final Conc. |
|---|---|---|---|
| $H_2O$ | Add to 25 µL | Add to 50 µL | |
| 2x Phusion Blood PCR Buffer | 12.5 µL | 25 µL | 1x |
| Primer F (Forward) | x µL | x µL | 0.5 µM |
| Primer R (Reverse) | x µL | x µL | 0.5 µM |
| Phusion Blood DNA Polymerase | 0.5 µL | 1 µL | |
| 903/FTA Card | 1 mm punch | 1 mm punch | |
| Optional Components for Reaction Optimization* | | | |
| 50 mM $MgCl_2$ | 0.75 µL | 1.5 µL | |
| 50 mM EDTA | 0.6-1.25 µL | 1.25-2.5 µL | |
| DMSO | 1.25 µL | 2.5 µL | 5% |

The components were then subjected to a PCR thermocycling protocol. In this instance, the 2-step protocol was used when primer Tm values were 69-72° C., as detailed in Table 2 below This Table shows also the alternative 3 step protocol.

TABLE 2

| | 2-step Protocol | | 3-step Protocol | | |
|---|---|---|---|---|---|
| Cycle Step | Temp. | Time | Temp. | Time | Cycles |
| Lysis of cells | 98° C. | 5 minute | 98° C. | 5 minute | 1 |
| Denaturation | 98° C. | 1 s | 98° C. | 1 s | 35-40 |
| Annealing* | — | — | x ° C. | 5 s | |
| Extension** | 72° C. | 15-30 s/kb | 72° C. | 15-30 s/kb | |
| Final extension | 72° C. | 1 minute | 72° C. | 1 minute | 1 |
| | 4° C. | hold | 4° C. | hold | |

The study confirmed that DNA can be directly amplified from blood stored on Whatman FTA sample collection cards, however, varying levels of inhibition was observed. Without any pre-treatments, a 1 mm punch of FTA Gene Card worked well only in a 50 µl reaction volume. For smaller reaction volumes, a very simple washing protocol was enough to remove inhibitors. After washing the card punch for 3 minutes with H2O, the sample was of sufficient purity for use in direct PCR reactions with Phusion Blood Direct PCR Kit at all reaction volumes tested.

Washed FTA punches (1 mm in diameter) were used in 50 µl reaction volumes with primers specific for 1 kb, 3.8 kb and 7.5 kb amplicons. In all cases, the PCR reaction generated the appropriately sized amplification product. The Phusion Blood Direct PCR Kit is compatible with blood from variety of species. A highly conserved 237 bp region upstream of the SOX21 gene (A. Woolfe, M. Goodson, PLoS Biol. 3, e7; 2004) was successfully amplified from blood of a number of vertebrate species dried onto FTA Gene Cards (see FIG. 7).

Figure 7:
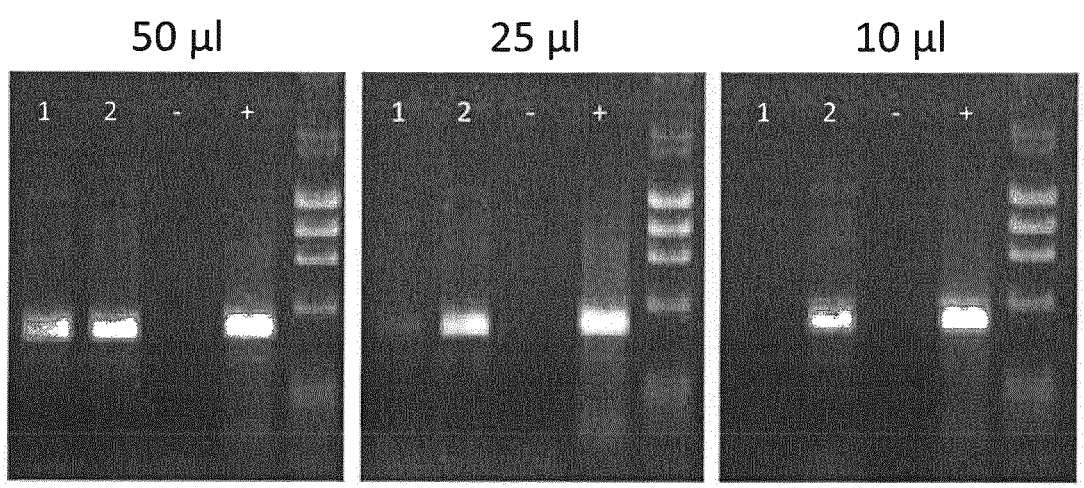

FIG. 7 shows direct amplification of a 500 bp genomic DNA fragment from human blood treated with heparin and preserved on Whatman FTA sample collection cards. Reactions were performed from 1 mm punches either rinsed or placed directly into PCR reactions of 50, 25 or 10 µl in volume. A 2-step PCR protocol described in Materials and Methods was used. 1=un-washed FTA cards, 2=washed FTA cards, (−)=Negative control and (+)=Positive control (purified human genomic DNA).

Figure 8:
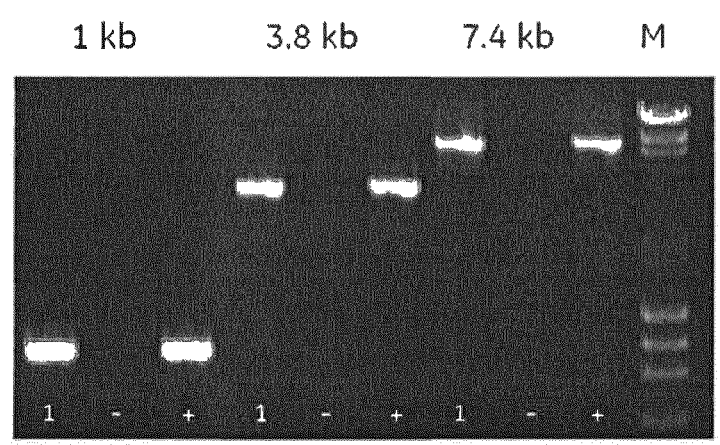

FIG. 8. Direct PCR of 1 kb, 3.8 kb and 7.5 kb gDNA amplicons from human blood treated with EDTA and preserved on FTA sample collection cards. Reactions were performed from 1 mm punches in 50 µl reactions (for the 7.5 kb fragment FTA punches were rinsed as described in Materials and Methods). A 2-step protocol was used for 1 kb and 7.5 kb fragments and a 3-step protocol for 3.8 kb amplicon. 1=FTA cards, (−)=Negative control, (+)=Positive control (purified human genomic DNA) and M=DNA molecular weight marker.

Figure 9:
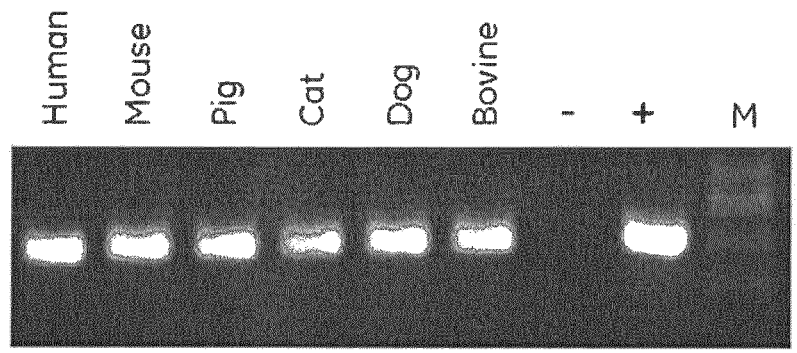

FIG. 9 shows Direct PCR performed on blood from several mammalian species treated with EDTA and preserved on washed FTA Gene Cards. Reactions were performed from 1 mm punches using the universal control primers included in the Phusion Blood Direct PCR Kit and 20 µl reaction volume. M=DNA molecular weight marker, (−) Negative control and (+) Positive control (purified human genomic DNA).

b. Genomic DNA Detection From Biological Samples Applied to FTA Sample Collection Cards Murine tissues from c57BL/6 mice and NOS3 null mice (in a 129/B6 background) were applied to FTA sample collection cards. These solid supports are chemically-treated cellulose-based papers. The mice were euthanized and dissected to collect organs (blood, heart, brain, lung, liver, and kidney). The Organs were 'sandwiched' between two paper layers. Pressure was applied via a sterile pipette to imbed tissues in each of the cellulose matrices. For tissue homogenate, approximately 5 g of tissue was processed using a plastic homogenizer in a 1.5 ml microfuge tube and then subsequently applied to the paper matrix. After application all the samples were allowed to air-dry for 2 hours prior to storage in a sealed pouch with desiccant. In some instances samples were stored up to 2 months before processing.

A Harris disposable micro punch (1.2 mm or 3 mm diameter) was used to excise the dried tissue samples from the FTA paper cards respectively in the form of punched discs. The sample disc was excised from the centre of the dried sample and placed in a clean DNase free-1.5 ml micro-centrifuge tube.

Null or gene knockout NOS3 mice were identified by PCR amplification of genomic DNA with endothelial Nitric Oxide Synthases (eNOS) exon 10-specific forward primer, eNOS Neo-specific forward primer, and eNOS exon 12-specific reverse primer.

Target DNA's were amplified with an initial 10 min denaturation step followed by 36 cycles of 940 C for 35 sec, 650 C for 1 min, and 720 C for 1 min; followed by a final extension at 720 C for 5 min. using a MJ Research thermocycler. The resultant PCR products were visualized with using an Experion capillary electrophoresis system. Mouse DNA quantification was achieved using the Primer Design genomic DNA quantification kit for mouse samples (gDNA-mo-q-DD) following manufacturer's instructions. Individual wild type (WT) and NOS null tissue samples were applied separately to different paper cards. In order to exemplify the ability to differentiate genotypic variants from DNA stored on the paper matrices, PCR amplification of a region was carried out on WT and transgenic (NOS3 null, gene knockout) mice.

Figure 10:
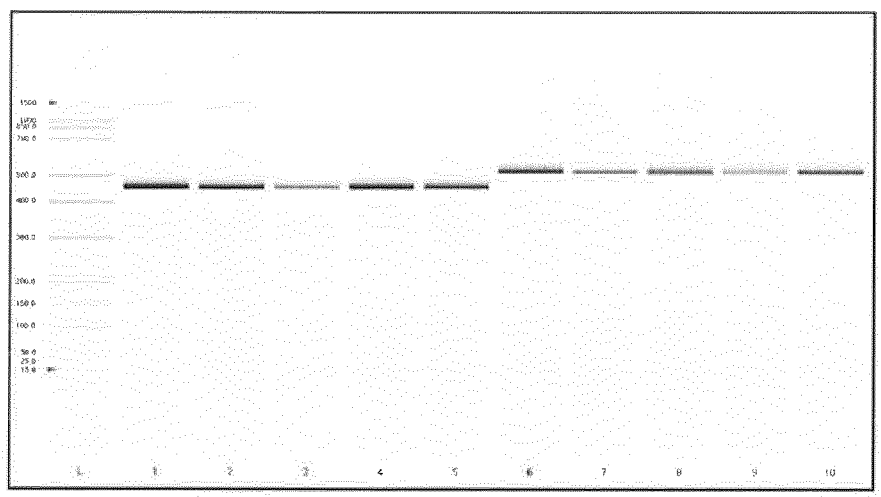

In FIG. 10 PCR amplicons are shown, associated with the NOS locus using DNA as an amplification template isolated from tissues from the paper cards. Lanes 1-5 are DNA isolated from WT mouse tissue (Heart, Liver, Brain, Lung, and Kidney respectively). Lanes 6-10 are DNA amplified from NOS mouse tissues (Heart, Liver, Brain, Lung, and Kidney respectively).

FIG. 10—DNA amplification products derived from tissue isolated from the WT and NOS3 null gene knock-out mice applied to FTA sample collection cards. Lanes 1-5 are DNA isolated from WT mouse tissue (Heart, Liver, Brain, Lung, and Kidney respectively). Lanes 6-10 are DNA amplified from NOS mouse tissues (Heart, Liver, Brain, Lung, and Kidney respectively).

FIG. 10—DNA amplification products derived from tissue isolated from the WT and NOS3 null gene knock-out mice applied to FTA sample collection cards. Lanes 1-5 are DNA isolated from WT mouse tissue (Heart, Liver, Brain, Lung, and Kidney respectively). Lanes 6-10 are DNA amplified from NOS mouse tissues (Heart, Liver, Brain, Lung, and Kidney respectively).

In Table 3 the successful amplification of DNA isolated from tissues stored on FTA sample collection cards is recorded. DNA was isolated from a 1.2 mm punch. '+' signifies the presence of amplicons. Table 4 DNA amplification of genomic DNA encoding for products derived from both the WT and NOS3 null gene knock-out mice (ND=not determined and (+) signifies the presence of the correctly sized PCR product.

TABLE 3

| DNA type | DNA Source | FTA sample collection card |
|---|---|---|
| Wild-Type Tissue DNA | Blood | ND |
|  | Heart | + |
|  | Liver | + |
|  | Brain | + |
|  | Lung | + |
|  | Kidney | + |
| Knock-Out Tissue DNA | Blood | ND |
|  | Heart | + |
|  | Liver | + |
|  | Brain | + |
|  | Lung | + |
|  | Kidney | + | c. Direct DNA STR Profiling Using FTA Sample Collection Cards

An experiment was carried out to amplify DNA directly from 106 human embryonic stem cells (GE Healthcare; cell line ref: WCB307 GEHC 28) applied to a solid cellulose support matrix ('FTA Sample Collection Cards'; GE Healthcare, catalogue code: WB120205). The direct amplification procedure involves taking a 1.2 mm punch from a sample collection card on which a biological sample has been applied. This punch is added directly to the STR amplification mixture. This direct approach does not require a washing step to remove the chemicals associated with the FTA punch prior to downstream workflows. Here, direct amplification of DNA from blood spots on FTA cards was undertaken. Direct STR profiling was carried out on duplicate samples using a PowerPlex 21 System (Product code DC8902, Promega, Southampton, UK) over 28 amplification cycles. The PowerPlex 21 System utilises four-colour fluorescent detection and facilitates the co-amplification of 21 loci (20 STR loci and Amelogenin), including D1S1656, D2S1338, D3S1358, D5S818, D6S1043, D7S820, D8S1179, D12S391, D13S317, D16S539, D18S51, D19S433, D21S11, Amelogenin, CSF1PO, FGA, Penta D, Penta E, TH01, TPDX and vWA. The PowerPlex 21 System provides all materials and reagents necessary to amplify the appropriate STR regions of human genomic DNA, including a hot-start thermostable DNA polymerase, master mix and primers. This kit was used to amplify DNA directly from 1.2 mm diameter samples punched from the FTA cards. The procedure was followed exactly as outlined in the instruction booklet (PowerPlex 21 System, Promega, Southampton, UK). Thermal cycling conditions were; 96° C. for 1 minute followed by 28 cycles of 94° C. for 10 seconds, 59° C. for 1 minute and 72° C. for 30 seconds. Finally the reaction was heated to 60° C. for 20 minutes.

Figure 11:
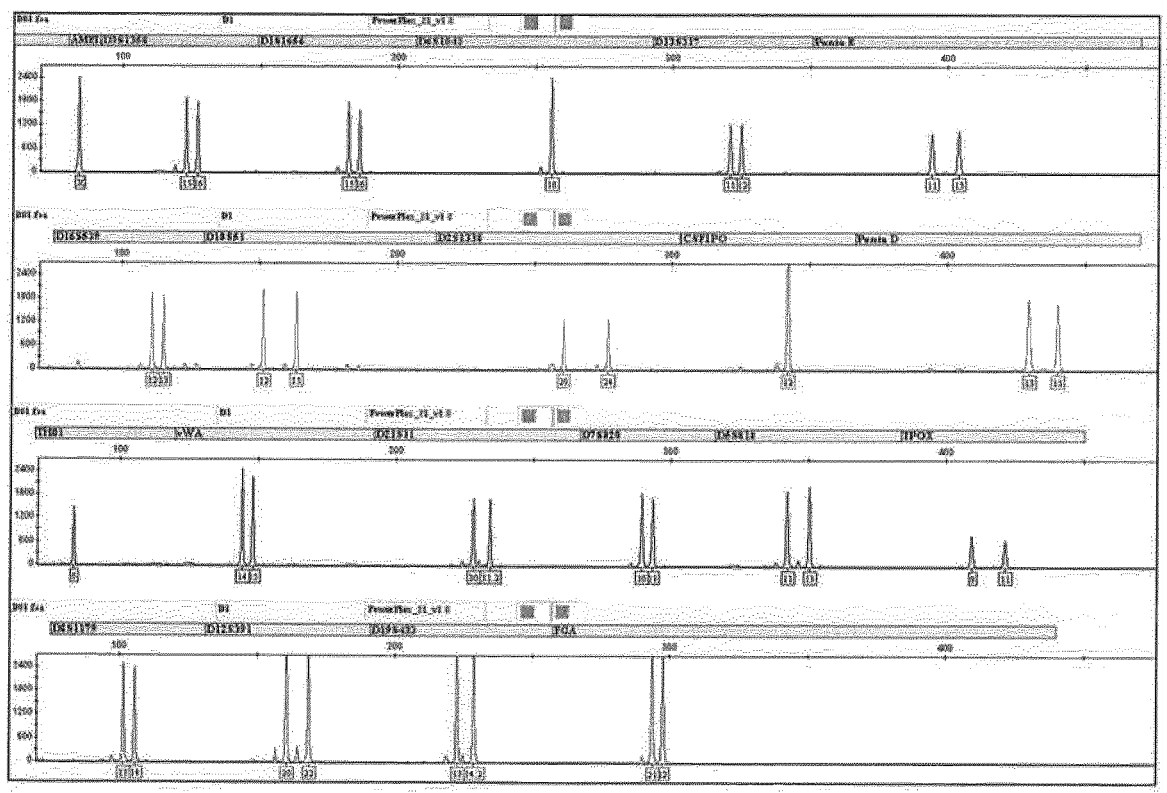

The resulting PCR products were separated using an ABI™ 3130xl Genetic Analyzer capillary electrophoresis system and analysed with GeneMapper™ ID v3.2 software (Life Technologies, Paisley, UK). The resultant STR profiles were interrogated and compared to standards and quality metrics such as peak heights etc. This study demonstrated that full DNA STR profiles were obtained from the FTA paper which had been added directly to the STR reagent mix without undergoing a prior washing step FIG. 11 shows direct STR profiling of human embryonic stem cells applied to FTA sample collection cards.

4. Specialized Chemically Treated RNA Stabilization Solid Supports

Tissue samples were applied to specialized RNA stabilization solid support paper cards as described previously. Sample punches were excised and the RNA isolated using the GE Healthcare illustra RNAspin kit as described below. RNA quantitation was performed on an ABI 7900 real time PCR system utilizing the commercially-available mRNA quantification kits as detailed in Table X.

Using a Harris 3 mm disposable micro punch, a punch was excised from the centre of the dried sample spot and place in a clean RNase-free 1.5 ml micro-centrifuge tube. The illustra buffer RA1 (350 µl) was combined with 3.5 µl β-mercaptoethanol and the solution was added to the disc. The disc was homogenized using a 20 gauge needle. The resultant homogenate was transferred to the RNAspin Mini filter column for subsequent removal of residual material. The column was centrifuged for 1 min at 11,000× g. and the RNAspin Mini Filter discarded. The homogenized lysate contains the RNA and this filtrate was transferred to a new RNase-free 1.5 ml micro-centrifuge tube.

Ethanol (70%; 350 µl) was added to the homogenized lysate and mixed by vortexing for 2×5 sec pulses. For each preparation, the lysate was pipette up-and-down 2-3 times, and applied to an RNA Mini-spin column placed in a 2 ml micro-centrifuge tube. The tubes were centrifuged for 30 sec at 8000× g and the flow through discarded. The RNA spin column was transferred to a new collection tube. The illustra MDB buffer (350 µl) was added and the tube centrifuged at 11000× g for 1 min. Once again the flow-through was discarded and the column returned to the collection tube. A DNase reaction mixture was prepared according to manufacturer's instructions and was added to the surface of the filter contained within the RNAspin column. This DNAse incubation was performed at room temperature for 15 min. The wash buffer RA2 (200 µl) was applied to the RNA Mini-spin column and the column was centrifuged for 1 min at 11000× g. Once again the flow-through was discarded and the column returned to the collection tube. Buffer RA3 600 µl was applied to the RNA Mini-spin column and the column centrifuge for 1 min at 11 000× g the flow-through was discarded and the column returned to the collection tube. An addition column wash with buffer RA3 (250 µl) was also performed. In order to dry the membrane completely, the column was centrifuged for 2 min at 11000× g and the column finally placed into a nuclease-free 1.5 ml micro-centrifuge tube. RNase-free water (40 µl) was applied to the column and the column centrifuged at 11000× g for 1 min. The purified RNA was either used immediately in downstream applications or stored at −80° C. until used.

To determine the integrity of RNA from multiple tissues after prolonged storage, real-time reverse transcription polymerase chain reaction (RT-PCR) was carried out on RNA isolated from mouse tissue samples stored on the paper cards. These were stored in the presence of a desiccant for 2 months. mRNA quantification was accomplished according to manufacturer's instructions using either i) the ABI Taqman rodent GAPDH control kit (part #4308313), ii) the Invitrogen real-time LUX mRNA primer sets for murine HPRT, GAPDH, and Beta-Actin genes (cat. 105M-02, 100M-02, and 101M-02 respectively) or iii) tissue specific gene primer sets from Applied Bio-systems (see Table X for details).

Figure 12:
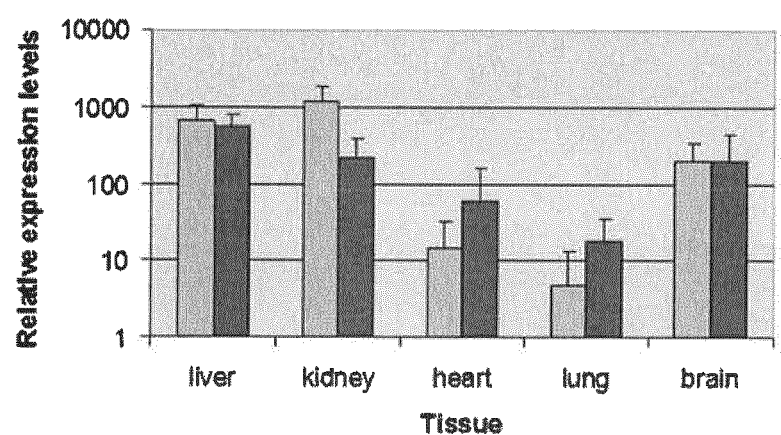

FIG. 12 shows the relative expression levels of GADPH from several tissue sources using the ABI Taqman rodent GAPDH control kit. RNA levels derived from samples applied to the solid support cards was determined by comparison to known values generated from a quantification titration curve from mouse RNA standard samples. Comparable GAPDH RNA levels were detected from RNA isolated from both paper types.

Absolute quantitation of murine mRNA encoding HPRT, GAPDH and Beta-Actin was carried out with the appropriate Invitrogen real-time LUX primer sets. RNA levels derived from samples applied to paper were determined by comparison to known values generated from a quantification titration curve from mouse RNA standard samples. Data associated with the isolation of RNA is described in Figure X and demonstrate that is material is able to support the storage and stabilization of RNA from numerous tissue types.

RNA expression multiplexing analyses can be performed using reverse-transcriptase PCR complementary oligonucleotide primers and probes such as the commercially-available Taqman probes (Invitrogen) and established methods and techniques.

FIG. 12 shows pairs of columns grouped together which represent the results from duplicate experiments.

5. Elution of Genomic DNA Analysis from Biological Samples Applied to FTA Elute Sample Collection Cards a. Quantitative PCR Using DNA Eluted from Biological Samples Applied to Indicating FTA Elute Whole blood and cultured HeLa cells (at a concentration of 1×107/ml) were spotted onto indicating FTA Elute cards. A 3 mm punch was taken from these cards (2×3 mm punch for blood and 1×3 mm punch for Hela cells). DNA was eluted from the sample collection cards following the high throughput elution protocol (see below), 5 μl of the eluate was added to the quantitative PCR Rnase P detection reagent (Applied Biosystems) following the manufacturer's instructions.

In addition, 1.2 and 3 mm punches were also excised and first washed with 1 ml of elution buffer prior to adding them to the Rnase P detection reagent.

Indicating FTA Elute high throughput elution protocol—Using a sterile 3 mm Harris Punch and a sterile cutting mat, punch two adjacent discs from clean sample collection cards were place into a well of a 96 well PCR plate (with 0.2 ml wells e.g., ABgene). These discs will be used as a negative/paper only control during the experiment. To prevent cross-contamination between blood spots and un-spotted controls: separate punches were used for each sample type. Using a different sterile 3 mm Harris Punch and a sterile cutting mat, punch two adjacent discs from the centre of a dried blood spot and place into a well of a 96 well PCR plate.

Once all discs have been punched & transferred to the 96 well plate, process as follows:—

Add 200 μl of sterile (room temperature) water to each well, seal the plate (e.g., with Microamp optical adhesive film, Applied Biosystems part number 4311971) and pulse vortex three times, each time for a total of five seconds (i.e., 3×5 secs. 15 seconds in total). Centrifuge the plate at 1200 rpm for 2 min. immediately aspirate water & discard. Once water has been aspirated from all samples in the 96 well plate add 60 μl of sterile water to each well and seal the plate with a plate seal (e.g., Microseal A film (Biorad)). Centrifuge the plate at 1200 rpm for 2 min and heat at 98° C. incubation for thirty minutes.

At the end of the thirty minute incubation step, remove the plate from the heat and pulse vortex 60 times (approximately one pulse/second) using a vortex mixer OR a plate shaker (e.g., Heidolph Titramax) set on maximum speed setting. The plate seal must be attached firmly to the plate before doing this to prevent cross-contamination of sample between wells. Centrifuge the plate at 1200 rpm for 2 min. Using a pipette (with volume set at 60 μl) and a sterile pipette tip, remove eluate from the wells of the 96 well plate and transfer to a separate (empty) well. Store the eluted DNA at 4° C. until ready for use.

RNAase P specific sequences were detected and quantified from biological samples applied to indicating FTA elute samples collection cards using the procedure described above and therefore demonstrate that samples applied to indicating FTA elute are amenable for use in a direct PCR-based amplification workflow (see Table 4). An unspotted or negative control punch did not generate any RNAse specific sequences (data not shown).

TABLE 4

| Sample | Indicating FTA Elute | Puch size | Protocol | Average DNA tiles (ng/μl) |
|--------|---------------------|-----------|----------|---------------------------|
| Blood | Batch A | 2 × 3 mm punches | Elution | 0.04 |
| Blood | Batch B | 2 × 3 mm punches | Elution | 0.05 |
| Blood | Batch C | 2 × 3 mm punches | Elution | 0.06 |
| Blood | Batch D | 1 × 1.2 mm punch | Direct/washed | 0.04 |
| HeLa | Batch A | 1 × 3 mm punch | Elution | 6.03 |
| HeLa | Batch B | 1 × 3 mm punch | Elution | 5.10 |
| HeLa | Batch C | 1 × 3 mm punch | Elution | 5.96 |
| HeLa | Batch D | 1 × 3 mm punch | Direct/washed | 0.80 |
| HeLa | Batch D | 1 × 1.2 mm punch | Rirect no wash | 1.74 |

Table 4 shows the results of quantitative PCR using human genomic DNA eluted from biological samples applied to indicating FTA Elute. As a comparison FTA elute sample collection cards were also subjected to direct and washed punch-in protocols.

b. Direct endpoint PCR using Ready to Go reagents (GE Healthcare) in combination with Hela cells applied to indicating FTA Elute to amplify Human Papilloma virus (HPV) 18 specific DNA sequences from genomic DNA derived from HeLa cells. Cultured HeLa (100 μl) cells at a concentration 2.5×106/ml were spotted onto indicating FTA Elute cards. A 1.2 mm punch was taken from these cards and placed directly into a 25 μl endpoint PCR reaction and amplified using the GEHC illustra PureTaq ReadyTo Go (RTG) beads. Human gDNA was used as a control template. This was repeated in a liquid format which uses the same PCR components. Table 6 provides details.

TABLE 6

|  | Qty per reaction (μl) | Final conc. |
|---|---|---|
| Liquid format | | |
| HPV-18 forward primer @ 10 pmol/ul | 0.5 | 5 pmoles |
| HPV-18 Reverse primer @ 10 pmol/ul | 0.5 | 5 pmoles |
| Human gDNA @ 1 ng/ul or 1.2 mm iFTAe punch | 2 ul gDNA or 1 × 1.2 mm punch | |
| dNTPs at 2.5 mM | 2.5 | 250 μM |
| Taq Polymerase 1U | 1 | 1 Unit |
| 10X PCR buffer-GEHC | 2.5 | |
| RNase free water | 16 | |
| Total | 25 μl | |
| RTG Bead format | | |
| HPV-18 forward primer @ 10 pmol/ul | 0.5 | 5 pmoles |
| HPV-18 Reverse primer @ 10 pmol/ul | 0.5 | 5 pmoles |
| Human gDNA @ 1 ng/ul or iFTAe punch/well | 2 ul gDNA or 1 × 1.2 mm punch | |
| 1 RTG bead/well | | |
| RNase free water | 22 | |
| Total | 25 ul | |

Figure 13:
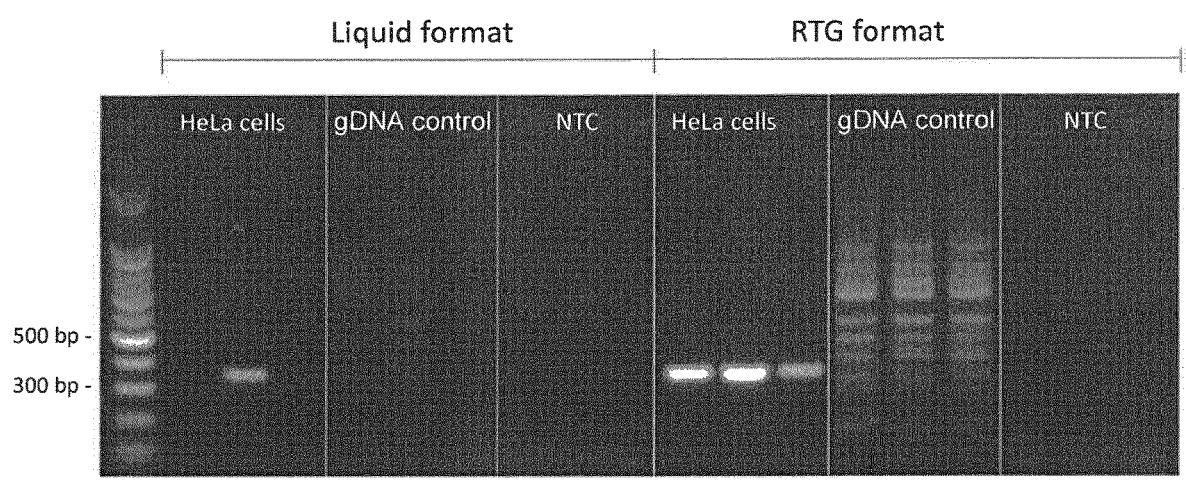

The forward and reverse sequence were of HPV type 18 specific. The presence of the HPV-18 virus is indicated by the amplification of a 334 bp PCR product as shown in FIG. 13, where successful amplification of HPV-18 specific sequences present in HeLa cells using a combination of indicating FTA elute with a Direct Endpoint PCR approach is illustrated.

Although embodiments have been described and illustrated, it will be apparent to the skilled addressee that additions, omissions and modifications are possible to those embodiments without departing from the scope of the invention claimed. For example sample collectors 10/100 have been described and illustrated employing four different areas for sample collection, three of which have a chemical treatment for aiding storing and preservation of the sample. However, it will be appreciated that more or fewer areas could be used, dependent on what diagnostic or research information is needed. The material used to form the sample collectors as described above are preferred, but other materials could be used with good effect. By 'infectious material' used herein is meant any disease causing microorganism or other agent, such as a bacterium, fungus, or virus.

The invention claimed is:

1. A biological sample handling method comprising the steps of:
   a) providing a sample collector comprising a solid support, the solid support having plural chemically differentiated sample receiving areas;
   b) applying a biological sample comprising RNA or DNA of an infectious virus and of a host to one or more of said areas;
   c) exposing said one or more areas to UV light sufficient to substantially inactivate the infectious virus present in the biological sample; and
   d) following step c) determining the RNA or DNA content of the infectious virus and the host in the biological sample.

2. The sample handling method of claim 1, further comprising the steps of:
   e) excising a portion of one or more said sample receiving areas into a receiving vessel; and
   f) performing an assay on biological material derived from the excised portion without transferring said excised portion to another vessel.

3. The sample handling method of claim 2, wherein said assay includes protein identification and/or enzyme identification, in each case of either biological sample material relating to the host or relating to the infectious virus to be identified within the sample.

4. The sample handling method of claim 1, further comprising the steps:
   a) drying said applied sample;
   b) covering said dried areas with a cover flap, optionally held in place by means of pressure sensitive adhesive; and
   c) storing said sample collector.

5. The sample handing method of claim 4, wherein the cover flap allows UV light substantially to pass therethrough.

6. The method of claim 1, further comprising collecting the infectious virus after the step (d).

7. The method of claim 6, wherein said infectious virus is viral RNA.

8. The sampling handling method of claim 1, wherein the RNA or DNA is from Ebola Virus Disease, Human Immunodeficiency Virus, or Influenza Virus.

9. The sample handling method as claimed in claim 1, wherein one or more of the sample receiving areas are coated with an antioxidant to protect the biological sample from degradation by UV light.

* * * * *